United States Patent
Wilkendorf et al.

(10) Patent No.: US 8,480,774 B2
(45) Date of Patent: Jul. 9, 2013

(54) FILTER DEVICE, PARTICULARLY REFLUX VACUUM FILTER, AND FILTER ELEMENT FOR SUCH A FILTER DEVICE

(75) Inventors: Werner Wilkendorf, Ottweiler (DE); Stefan Marschall, Schiffweiler (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 287 days.

(21) Appl. No.: 12/734,568

(22) PCT Filed: Nov. 4, 2008

(86) PCT No.: PCT/EP2008/009267
§ 371 (c)(1),
(2), (4) Date: May 10, 2010

(87) PCT Pub. No.: WO2009/065489
PCT Pub. Date: May 28, 2009

(65) Prior Publication Data
US 2010/0257824 A1    Oct. 14, 2010

(30) Foreign Application Priority Data
Nov. 22, 2007  (DE) .......................... 10 2007 056 362

(51) Int. Cl.
*B01D 46/00*    (2006.01)
(52) U.S. Cl.
USPC ................. 55/312; 55/310; 55/311; 55/417; 55/420; 55/498

(58) Field of Classification Search
CPC ....................................................... B01D 46/00
USPC ............. 55/312; 210/120, 130; 96/400–412
See application file for complete search history.

(56) References Cited

U.S. PATENT DOCUMENTS

| | | | | |
|---|---|---|---|---|
| 3,314,542 A * | 4/1967 | Kudlaty | ......................... | 210/130 |
| 3,618,776 A * | 11/1971 | Kudlaty | ......................... | 210/130 |
| 3,640,390 A * | 2/1972 | Goy et al. | ..................... | 210/130 |
| 3,996,137 A * | 12/1976 | Cooper | ......................... | 210/130 |
| 4,133,763 A * | 1/1979 | Cooper | ......................... | 210/232 |
| 4,279,746 A * | 7/1981 | Leutz | ............................ | 210/130 |
| 5,669,366 A * | 9/1997 | Beach et al. | .................. | 123/572 |
| 5,772,868 A * | 6/1998 | Reinhardt | ...................... | 210/120 |
| 6,217,755 B1 * | 4/2001 | Stifelman et al. | ............ | 210/116 |
| 6,371,088 B1 * | 4/2002 | Wheeler | ....................... | 123/514 |
| 6,605,210 B2 * | 8/2003 | Reinhardt | ..................... | 210/130 |
| 6,733,666 B1 * | 5/2004 | Wilkendorf et al. | .......... | 210/130 |

FOREIGN PATENT DOCUMENTS

| | | |
|---|---|---|
| DE | 92 15 351.8 U1 | 12/1992 |
| DE | 42 43 217 A1 | 6/1994 |
| GB | 913 414 A | 12/1962 |
| WO | WO 2005/063358 A2 | 7/2005 |
| WO | WO 2007/011223 A2 | 1/2007 |

\* cited by examiner

*Primary Examiner* — Duane Smith
*Assistant Examiner* — Sonji Turner
(74) *Attorney, Agent, or Firm* — Roylance, Abrams, Berdo & Goodman LLP

(57) ABSTRACT

A filter device, in particular a reflux vacuum filter, has at least one filter housing (7) in which at least one filter element (3) can be accommodated. The filter element defines a longitudinal axis (25), and has at least two valve units in the form of a bypass valve ($V_2$) and of a pre-pressurizing valve ($V_1$). The valve units are arranged concentric to and along the longitudinal axis (25) of each filter element (3).

34 Claims, 6 Drawing Sheets

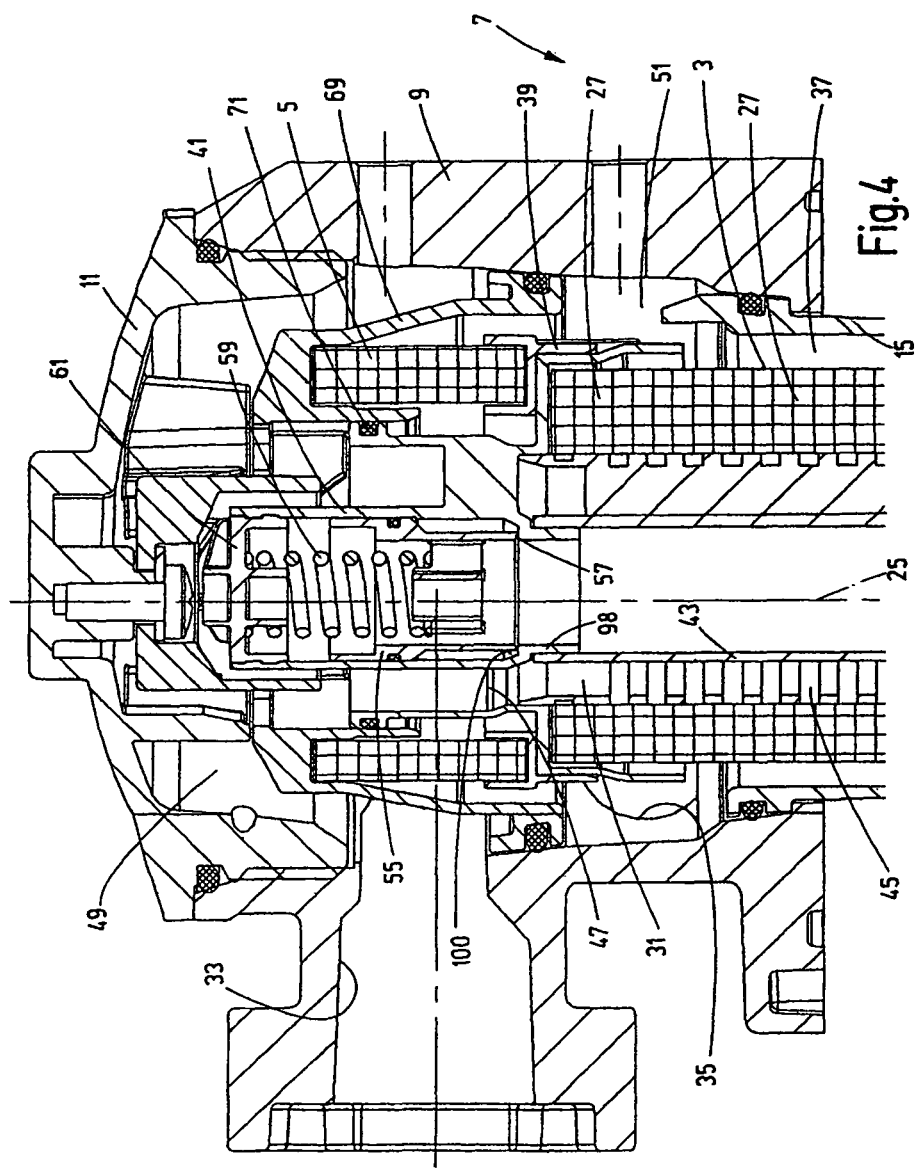

FILTER DEVICE, PARTICULARLY REFLUX VACUUM FILTER, AND FILTER ELEMENT FOR SUCH A FILTER DEVICE

FIELD OF THE INVENTION

The invention relates to a filter device, particularly a reflux vacuum filter, with at least one filter housing receiving at least one filter element defining a longitudinal axis. At least two valve units, particularly in the form of a bypass valve and a back pressure valve are provided. Moreover, the invention relates to a filter element for such a filter device.

BACKGROUND OF THE INVENTION

Reflux vacuum filters of the aforementioned type are known. One device of this type is marketed by the company ARGO-HYTOS GmbH and is commercially available under the type designation E084. Reflux vacuum filters are used in hydraulic systems having both an open hydraulic circuit (such as working hydraulics) and a closed hydrostatic system (for example, a traveling mechanism). Reflux vacuum filters can assume both the function of the reflux filter of the open circuit and the function of the vacuum filter of the closed circuit (mechanism), assuming that the reflux flow of the open hydraulic system is not smaller than the volumetric flow of the feed pump for the hydrostatic system.

In the operation of these devices, the reflux amount, for example, of the working hydraulics, is supplied to the filter and is purified by the filter medium of the filter element, and full-flow extremely fine filtration can take place. In the filtered fluid available to the feed pump of the hydrostatic system, a preload pressure is maintained by the back pressure valve and ensures that the amount of filtered reflux required by the feed pump of the compensator can be removed. Excess amounts travel via the back pressure valve to the tank connection and are drained towards the tank. At high dynamic pressures caused, for example, by fouling at the filter element, a pressure decrease takes place by triggering of the bypass valve.

SUMMARY OF THE INVENTION

An object of this invention is to provide a reflux vacuum filter device whose construction enables easy installation in the pertinent hydraulic systems, especially with restricted space conditions where only limited installation space is available.

According to the invention, this object is basically achieved by a filter device having all the main components arranged concentrically to the longitudinal axis of the filter element. The overall device can form a slender, uniform body, for example, in an extended cylindrical shape without assemblies protruding laterally on the body or offset to the longitudinal axis, for example, in the form of a bypass valve located laterally to the cylindrical body.

In advantageous exemplary embodiments, a third valve unit, specifically in the form of a replenishing valve, is concentric to the longitudinal axis of the filter element. Without departing from the in-line construction, this arrangement ensures that when the reflux pressure fails, an amount of fluid can travel via the replenishing valve from the tank to the intake side of the feed pump of the hydrostatic circuit in an emergency function, so that, for example, the connected traveling mechanism does not fail.

In especially advantageous exemplary embodiments in which the filter housing has a head-side cover part with fluid guides bordering the upper end region of the inserted filter element as well as at least one filter input for reflux fluid and at least one filter output for cleaned fluid, the bypass valve is located in the region of the cover part and is in a fluid connection to the fluid guide at the filter input. Compared to the conventional positional arrangement provided for bypass valves, the bypass valve is offset away from the filter sump towards the head side, i.e., into the immediate region of the filter input. At high dynamic pressures, the pressure decrease then takes place directly at the filter input. In this way, operating reliability, especially during cold starting phases, is increased.

Preferably, the filter housing has a bottom-side tank connection for the discharge of excess reflux amounts to the tank. The back pressure valve in the bottom region of the filter housing adjacent to the tank connection for blocking or clearing a fluid connection is located between the filter output and tank connection.

Exemplary embodiments in which the replenishing valve is located underneath the back pressure valve, nearer the tank connection, in the bottom region of the filter housing, are especially suitable for tank installation of the device since separate feed lines to the replenishing valve are not necessary.

The device can be advantageously designed such that the filter medium of the filter element, through which flow can take place from outside to inside during filtration, surrounds a coaxial, fluid-permeable support pipe. Within and at a distance from the support pipe, a concentric interior pipe is provided. The cleaned fluid located on its exterior on the end of the interior pipe is fluid-connected to the units located in the bottom region of the filter housing in the form of the back pressure valve and of the replenishing valve. In this way, within the filter element a pipe-in-pipe system is formed in which the interior pipe exterior borders the clean side during filtration and forms the fluid connection to the bottom-side valve units. This pipe-in-pipe construction leads to an especially compact, slender body of the device with high inherent stability, even when potential pressure fluctuations occur during operation.

In these exemplary embodiments, preferably, the bottom region of the filter housing can have a pipe body continuing the interior pipe of the inserted filter element. The valve bodies of the back pressure valve and replenishing valve are guided on the pipe body for opening and closing movements opposite one another. These valve units then form a direct coaxial extension on the bottom of the filter element.

In especially advantageous exemplary embodiments, the bypass valve is integrated into the head-side end cap of the filter element. In the cap, at least one bypass channel is formed which with the filter element inserted connects the filter input of the cover part of the filter housing to the input side of the bypass valve.

Preferably, the bypass valve is a spring-loaded spool valve whose spool is guided in a hollow-cylindrical valve housing concentric to the longitudinal axis. During opening dictated by the dynamic pressure, this valve forms the fluid connection between the bypass channel and interior of the valve housing.

An especially compact construction is produced when the interior pipe of the filter element is a bypass pipe forming on the inside at least part of the fluid connection between the interior of the valve housing of the bypass valve and the tank connection located in the bottom region. In this respect, the valve housing of the bypass valve can form a direct fluid connection to the facing end of the interior pipe. With the bypass valve opened, the pressure decrease out of the valve housing then takes place directly through the interior pipe used as the bypass pipe to the tank connection.

The invention offers an especially advantageous option for changing the hydraulic circuit as desired. While when using the interior pipe as the open bypass pipe when the bypass valve is triggered, the pressure drop takes place directly to the tank by way of the interior pipe. The circuit can also be made such that the fluid flowing away when the bypass valve opens does not travel to the tank, but rather flows out of the valve housing directly to the clean side of the filter element, i.e., to the filter output of the device. In this case, the interior pipe of the filter element is closed, and the valve housing has an outflow region with the bypass valve open forming the fluid connection from the interior of the valve housing to the filter output in the cover part.

In this connection, the outflow region of the bypass valve can be formed by openings in the valve housing cover. As a head-side, round plug, the housing cover forms the support of the closing spring of the bypass valve. For the fluid flowing off by way of the openings in the valve housing cover, the flow conditions are especially favorable when the openings in the valve housing cover are made in an arrangement distributed in a star shape and with a trapezoidal opening surface.

In particular, in cases where the interior pipe is closed and the fluid is flowing directly to the filter output when the bypass valve has been triggered, a protective bypass screen is preferably integrated into the pertinent fluid guide in the cover part. The fluid traveling to the clean side is then free of at least coarser dirt.

To prevent the danger of dirt being able to travel by way of replenished fluid to the clean side and to the connection of the feed pump of the downstream hydrostatic circuit when the replenishing valve is opened, preferably a replenishment screen arrangement is inserted into the fluid path between the replenishment openings of the replenishing valve and the tank connection.

The subject matter of the invention is also a filter element for a filter device.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 4 is a partial side elevational view in section of only the upper, cover-side portion of the filter device of the first embodiment of FIG. 1, but with a protective bypass screen additionally provided;

DETAILED DESCRIPTION OF THE INVENTION

Figure 1:
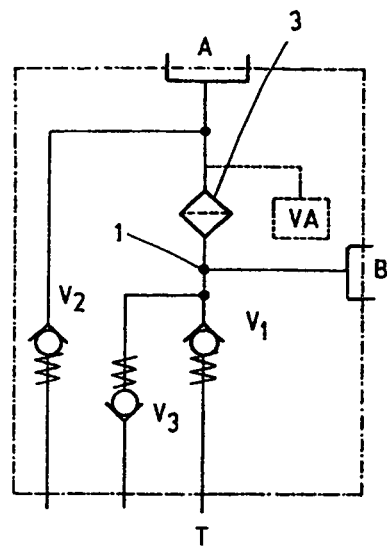
FIGS. 1 to 3 are schematic diagrams of circuits of the components of a first exemplary embodiment, a second exemplary embodiment and a third exemplary embodiment of the filter device according to the invention, respectively.
Figure 2:
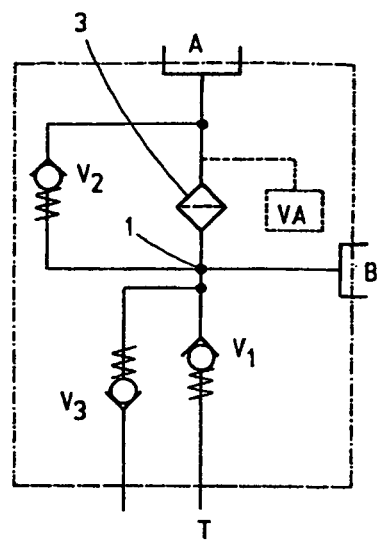
Figure 3:
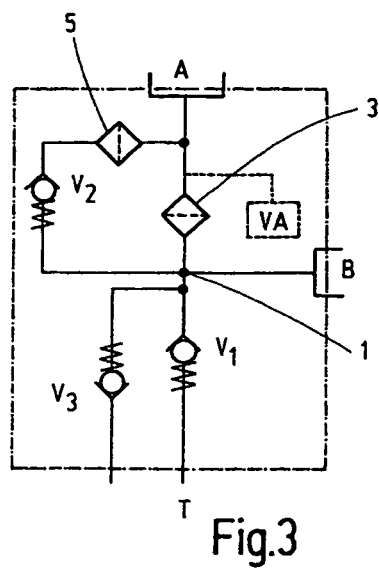

In the circuit examples shown in FIGS. 1 to 3, a connection A is supplied with a fluid reflux amount from working hydraulics (not shown). By way of a connection B, the feed pump of a compensator (not shown), for example a hydrostatic traveling mechanism (not shown), is supplied with the amount of fluid required as the fill amount. This amount of fluid is removed on the clean side 1 of a filter element 3, i.e., from the reflux flow filtered in full flow and exceeding the filling flow required by the feed pump of the downstream compensator. The clean side 1 of the filter element 3 is connected by way of a back pressure valve $V_1$ to the tank connection T. The back pressure valve $V_1$ can be opened by pressure actuation and is set to an opening pressure ensuring that on the clean side 1 and thus on the connection B a pressure level is maintained at which the feed pump of the downstream compensator can remove the required amount by way of the connection B. On a standard basis, the back pressure valve $V_1$ is set to an opening pressure of 0.5 bar.

Downstream of the back pressure valve $V_1$, a replenishing valve $V_3$ openable likewise by pressure actuation is connected and is set to a low opening pressure of roughly 0.05 bar. Replenishing valve $V_3$ opens when the pressure of the reflux amount has dropped on the clean side 1. For operation of the suction pump connected downstream of the connection B, fluid then needs to be replenished via the replenishing valve $V_3$ from the tank as an emergency function. When the dynamic pressure prevailing on the filter element 3 exceeds a threshold value, recognized, for example, by a fouling indicator VA connected to the dirty side at the connection A, a bypass valve $V_2$, can be actuated by pressure to open for a pressure reduction from connection A, and for the circuit from FIG. 1, towards the tank. Conventionally, a dynamic pressure of roughly 2 bar prevailing on the filter element 3 is the opening pressure for the bypass valve $V_2$. In FIG. 1 with the back pressure valve $V_1$ set to an opening pressure of 0.5 bar, the bypass valve $V_2$ would accordingly be set to an opening pressure of 2.5 bar.

The versions of FIGS. 2 and 3 differ from FIG. 1 in that the pressure drop from connection A does not take place by way of the bypass valve $V_2$ towards the tank, but by way of the clean side 1 of the filter element 3 and by way of the back pressure valve $V_1$ to the tank connection T. The bypass valve $V_2$ can then be set to an opening pressure of 2.0 bar on a standard basis.

The circuit version shown in FIG. 3 corresponds to that from FIG. 2, except that a protective bypass screen 5, also in the from of a filter element, is located in the flow path of the fluid flowing through the bypass valve $V_2$ so that the connection B is protected from fouling even when the bypass valve has been opened. The circuit version of FIG. 2 in which the filter element 3 can be directly bypassed by the opened bypass valve $V_2$, without the fluid flowing away via the bypass valve having to flow through a protective screen or protective filter, is advantageous in those cases in which the fluid is an oil of high viscosity for example, during cold starting phases. As is detailed below, the invention makes switching the circuit between the operating modes shown in FIG. 1 or those in FIGS. 2 and 3.

Figure 5:
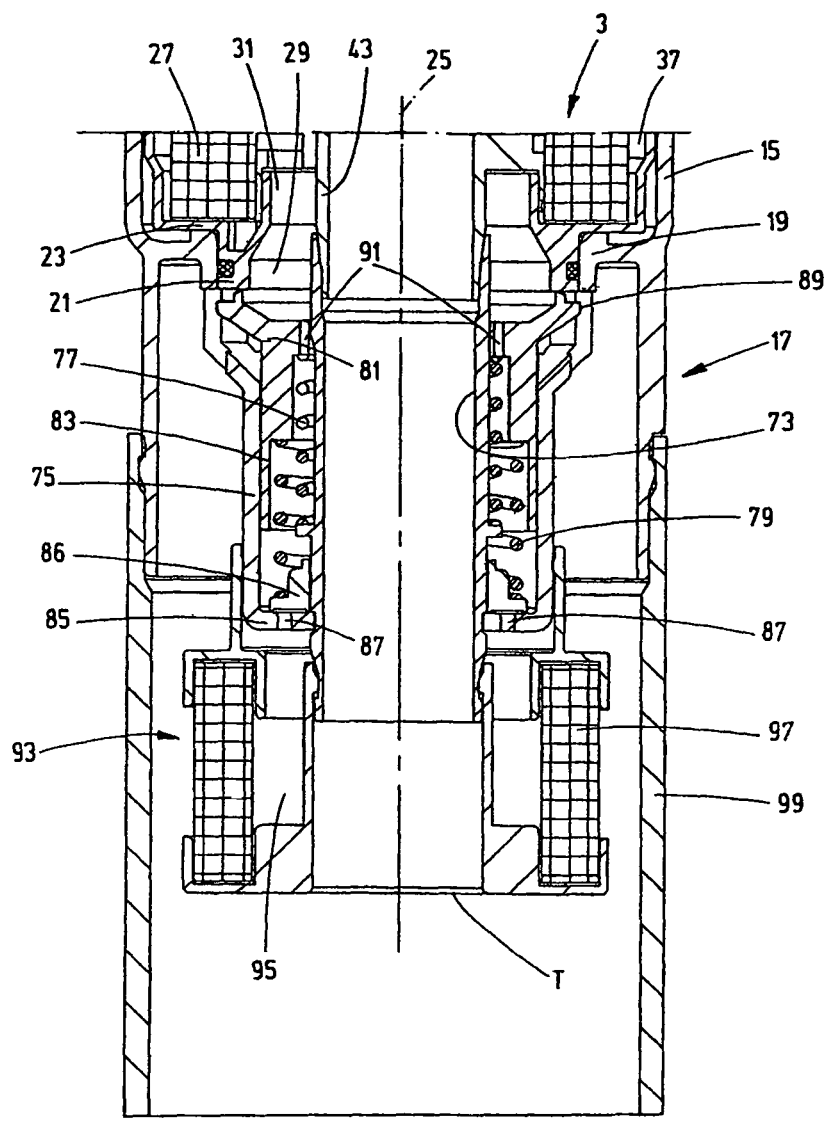
FIG. 5 is a partial side elevational view in section of only the bottom-side, lower partial portion of the first embodiment of the device shown in FIG. 4.
Figure 6:
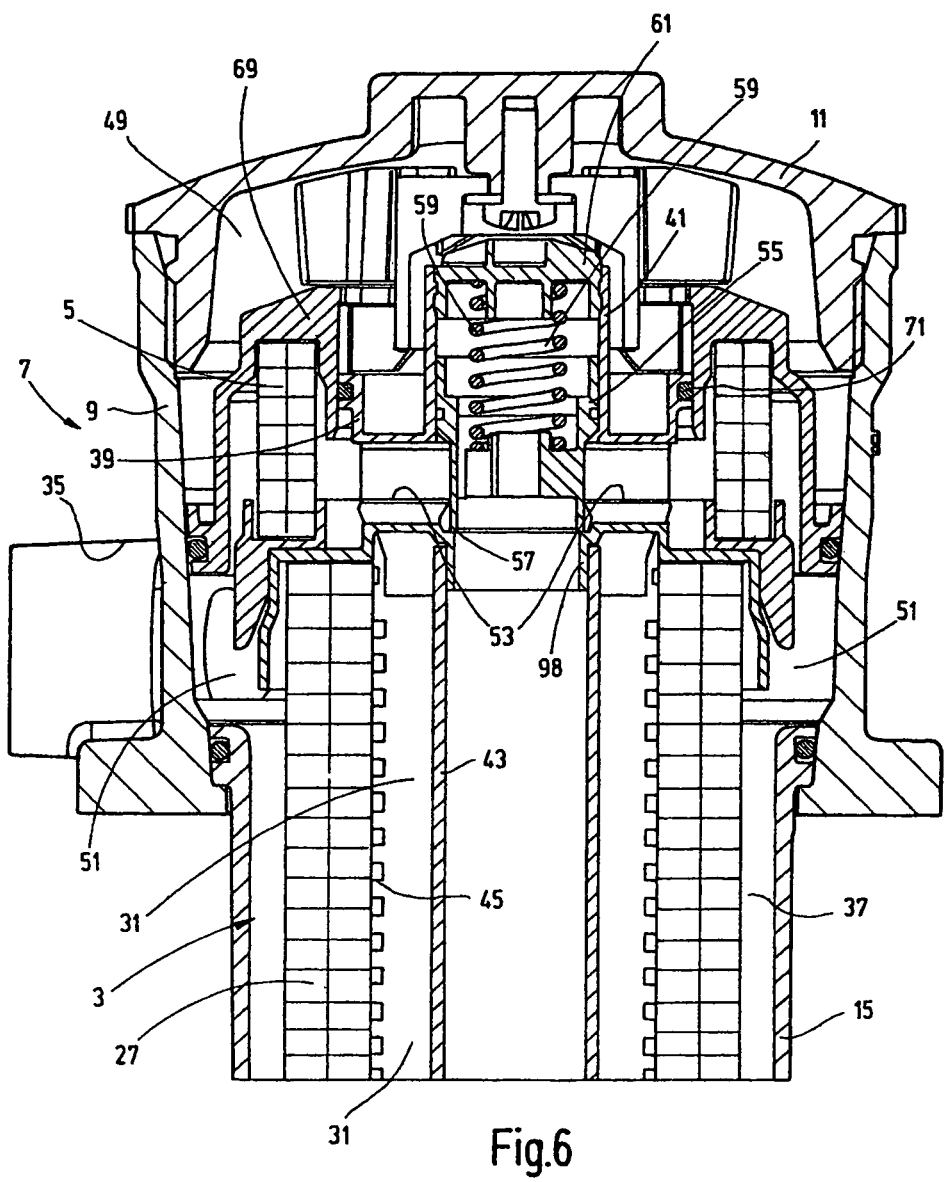
FIG. 6 is a partial front elevational view in section of the head-side partial portion turned by 90 degrees compared to FIG. 4.

FIGS. 4 and 6 each show the head-side end region of a filter housing 7 of the device in an embodiment in which a protective bypass screen 5 or a bypass filter element is present. In these figures the head-side cover part 9 of the filter housing 7 has an upper end termination 11 screwed to the cover part 9. After the end termination 11 is unscrewed, the filter element 3 of a largely circular cylindrical shape can be placed in the hollow cylinder-shaped main body 15. The bottom region 17 of main body 15 (see FIG. 5) forms an element receiver 19 holding a ring body 21 of the filter element 3 to form a seal. The ring body 21 forms an extension of the bottom-side end cap 23 of the filter element 13. This extension is coaxial to the longitudinal axis 25 of the filter element 13. The end cap 23 forms an enclosure for the lower end of the filter medium 27 of the filter element 3. The ring body 21 surrounds the opening region 29 of the end cap 23. This region 29 is fluid-connected to or in fluid communication with the inner filter cavity 31 of the filter element 3 forming the clean side during filtration.

FIG. 4 shows the upper region of the device in a position in which the filter output 33 corresponding to the connection B in FIGS. 1 to 3 is visible. Conversely, FIG. 6 shows this section of the device in the rotary position in which the filter input 35 can be seen. With the filter element 3 inserted, the filter input 35 is fluid-connected or in fluid communication by way of fluid guides 51 to the exterior 37 of the filter medium 27. The filter medium exterior forms the dirty side during filtration. Fluid medium flow takes place during filtration from the filter medium exterior to the inner filter cavity 31 forming the clean side. The upper, head-side end cap 39 of the filter element 3 forms not only the enclosure for the upper end of the filter medium 27, but a hollow cylinder-shaped valve housing 41 for a bypass valve and a support for an interior pipe 43. Interior pipe 43 is concentric to the longitudinal axis 25 and extends, leaving open the filter cavity 31 forming the clean side, at a distance from the support pipe 45 on whose exterior the filter medium 27 rests. The filter cavity 31 forming the clean side is connected via passages 47 in the end cap 39, of which FIG. 4 shows one, to a fluid guide 49 in the cover part 9 leading to the filter output 33, i.e., to the connection B. The exterior 37 of the filter medium 27 forming the dirty side is in turn connected in the cover part 9 to the fluid guide 51 connected in the cover part 9 to the filter input 35, i.e., the connection A. As is apparent from FIG. 6, bypass channels 53 extend from the fluid guide 51 to the interior of the valve housing 41. In the valve housing 41, the valve spool of the bypass valve $V_2$, made as a spool valve is movably guided. The valve housing 41 forms a hollow cylinder concentric to the longitudinal axis 25. On the valve housing inside wall, the valve spool 55 is guided and has an end-side closing edge 57. When the valve spool 55 has been pushed into the open position, closing edges 57 clears the fluid path from the bypass channels 53 into the interior of the valve housing 41 and thus into the interior pipe 43. In the exemplary embodiments in which, as shown in FIGS. 4 to 6, the interior pipe 43 is open, i.e., is passable, when the bypass valve $V_2$ has been opened, the pressure can drop by the fluid flowing away through the interior pipe 43 to the tank connection T. The valve spool 55 is pretensioned into the closed position by a compression spring 59 clamped between the valve spool 55 and a cover 61 forming the end-side termination of the valve housing 41. In the exemplary embodiments with the through interior pipe 43 (FIGS. 4 to 6 and 8), the valve housing cover 61 is a round plug in the form of a closed cap.

Figure 9:
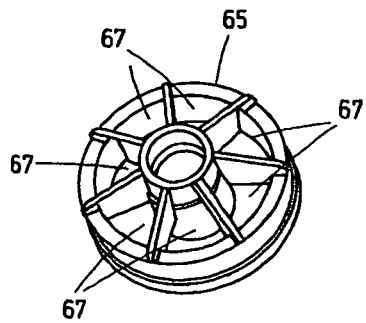
FIG. 9 is a perspective view of the valve housing cover of the bypass valve of the exemplary embodiment of FIG. 7.

As already mentioned, the circuitry of the device can be easily changed such that the fluid flowing away via the bypass valve $V_2$ does not travel directly to the tank, as is the case in the circuit of FIG. 1. According to the circuits from FIGS. 2 and 3 with the bypass valve $V_2$ opened, the fluid flowing away travels to the clean side 1 of the filter element 3 and can travel from there via the back pressure valve $V_1$ to the tank connection T. To execute the circuit in this way, i.e., to shift the device into the state shown in FIG. 7, only two measures are necessary. First the closure of the interior pipe 43 is accomplished, for example, by the crosspiece 63 in FIG. 7. Second, instead of the housing cover 61 in the form of a closed cap, a housing cover 65 open on the top is used, as is shown separately in FIG. 9. As shown in FIG. 9, the housing cover has outflow openings 67 of a trapezoidal opening surface. Openings 67 are arranged in a star shape through which fluid can flow out of the valve housing 41, without stronger flow resistance having to be overcome, to the fluid guide 49 and thus to the filter output 33 when the valve spool 55 against the force of the spring 59 executes an opening motion in which the closing edge 57 forms an opening gap so that fluid flows into the valve housing 41 out of the bypass channels 53.

For viscous fluids, for example oil with high viscosity prevailing during cold starting phases, the direct flow connection between the filter input 35 and filter output 33 formed in this way with the bypass valve $V_2$ opened is advantageous, especially when the protective bypass screen 5 or filter is not connected upstream of the bypass channels 53. On the other hand, using a protective bypass screen or filter avoids the danger that with the bypass valve $V_2$ opened dirt can travel to the filter output 33. In the exemplary embodiments shown in FIGS. 4 to 7, a protective bypass screen 5 each is arranged within a bell-shaped intermediate body 69 such that it is located in the fluid path between the fluid guides 51 and the bypass channels 53.

The bell-shaped intermediate body 69 within the cover part 9 separates the fluid guides 49 and 51 from one another and at the same time forms or supports the seal 71 for the upper end cap 39 of the filter element 3.

Figure 7:
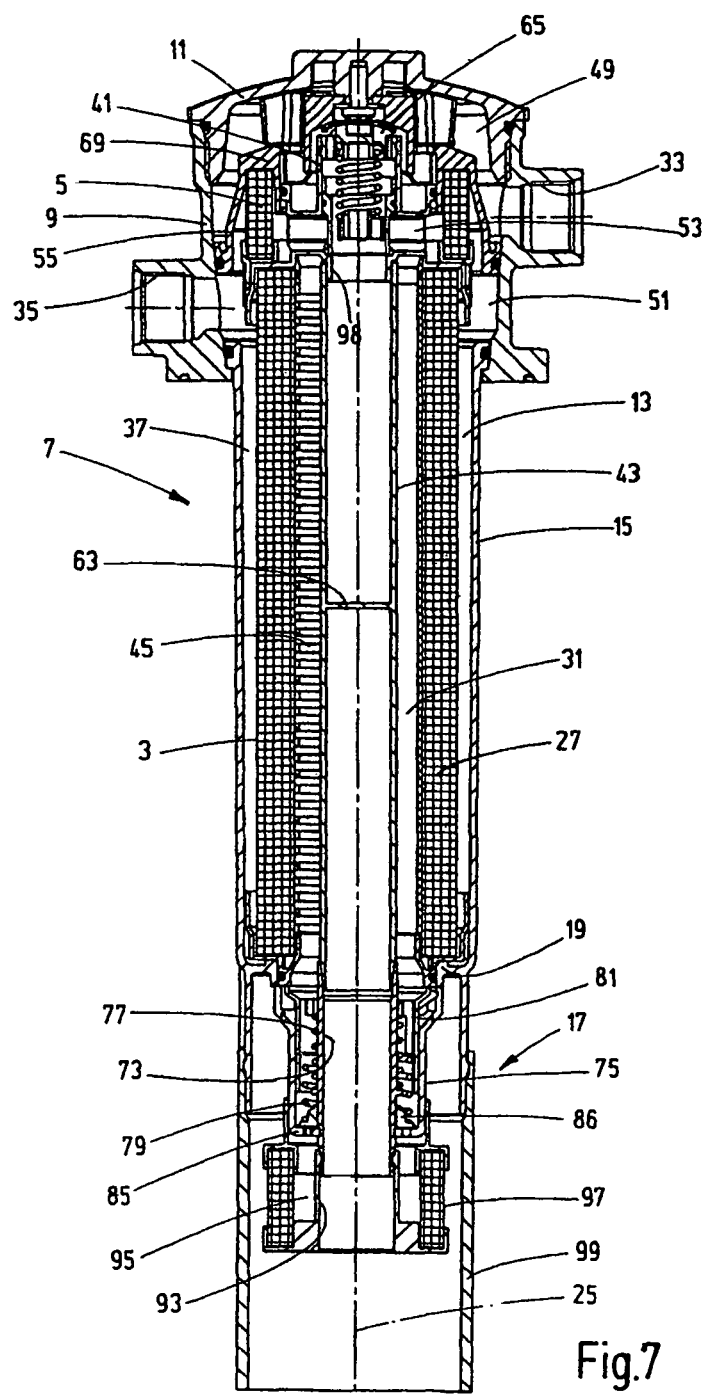
FIG. 7 is a side elevational view in section of a filter device drawn on a smaller scale compared to FIGS. 4 to 6 according to the circuit of the third embodiment of FIG. 3.

FIGS. 5 and 7 show the lower bottom region 17 which is connected to the element receiver 19; its details are shown most clearly in FIG. 5. As illustrated, the interior pipe 43 of the filter element 3 is extended down towards the tank connection T. The filter cavity 31 of the filter element 3 forming the clean side is connected to a pipe body 73 by way of the opening regions 29 in the end cap 23 of the filter element. To form a spring housing, the pipe body is surrounded by a hollow cylindrical spring housing 75 concentric to the longitudinal axis. This spring housing receives a closing spring 77 for the back pressure valve $V_1$ and a spring 79 for the replenishing valve $V_3$. The two compression springs surround the pipe body 73. The back pressure valve $V_1$ has an axially movable valve body 81 guided on the exterior of the pipe body 73 with a hollow cylindrical extension 83 on the inside of the spring housing 75. The spring housing 75 has a cup bottom 85 through which the pipe body 73 extends, and has several replenishment openings 87. This cup bottom 85 forms the valve seat for the valve body 86 of the replenishing valve $V_3$, which body is made as a ring plate.

The valve body 81 of the back pressure valve $V_1$ interacts with the ring body 21 on the end cap 23 of the inserted filter element 3 as a valve seat, against which the valve body 81 is pressed by the closing spring 77. When the valve body 81 is raised against the force of the closing spring 77, fluid flows out of the interior 31, i.e., the clean side of the filter element 3, via the open region 29 of the end cap 23 along the exterior of the spring housing 75 directly to the tank connection T. When no filter element 3 has been inserted into the device, the valve body 81 with a radially outlying valve disk edge 89 forms the seal of the device relative to the tank connection side by the valve disk edge 89 sealing against the element receiver 19 of the main housing part 15.

The interior of the spring housing 75 is connected by fluid to the filter interior 31, i.e., to the clean side, by the fluid passages 91 made in the valve body 81 and by the opening regions 29 of the end cap 23. Towards this clean side, when the valve body 86 made as a ring plate is raised against the force of the closing spring 79 away from the replenishment openings 87, fluid can be replenished from the side of the tank connection T to travel by the fluid passages 91 of the valve body 81 to the cavity 31 and thus to the clean side and to the connection B.

As likewise shown in FIG. 5, the underside of the body 85 of the spring housing 75 is connected to a screen housing 93 whose interior 95 borders the replenishment openings 87. Between the interior 95 and its exterior, i.e., the tank connection T, a replenishment screen 97 or replenishment filter is provided so that in the replenishment process direct unfiltered replenishment of fluid from the tank connection T does not take place.

As can be taken from FIGS. 5 and 7, the bottom region 17 of the main housing body 15 is connected to an extension pipe 99 made as a submersible pipe of the desired length, for example in tank installation, depending on installation conditions.

Figure 8:
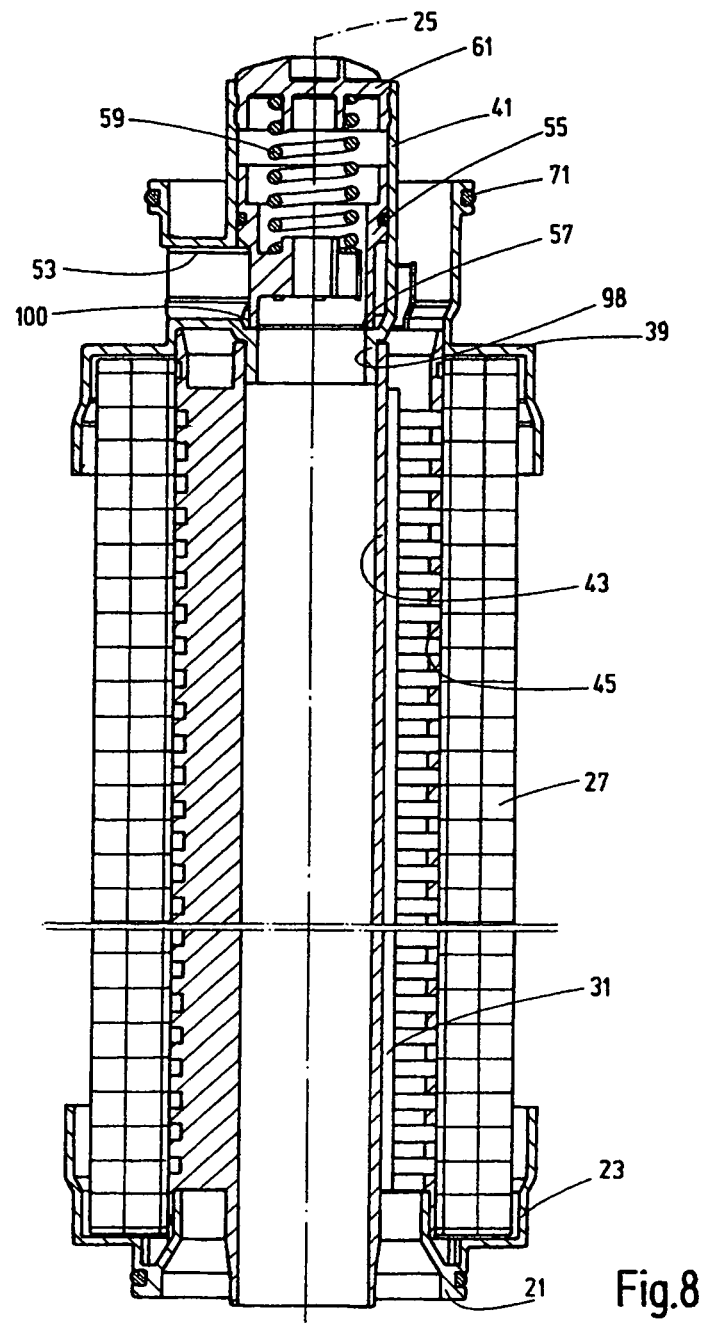
FIG. 8 is a side elevational view in section of only the filter element of the first exemplary embodiment of the filter device corresponding to the circuit of FIG. 1.

FIG. 8 shows a filter element 3 separately. It has a continuously open interior pipe 43 and accordingly a valve housing cover 61 in the form of a closed cap. The upper end cap 39 forms a pipe socket 98 projecting appropriately into the end of the interior pipe 43. Opening edge 100 of pipe socket 98 interacts with the closing edge 57 of the valve spool 55. When the closing edge 57 is raised off the edge 100, the fluid path is cleared from the bypass channels 53 into the interior of the valve housing 41 and into the interior of the interior pipe 43 now acting as a bypass pipe towards the tank side.

With the filter device according to the invention, a novel pipe-in-pipe system is formed in which the bypass pipe is centrally guided through the filter element support pipe. The position of the bypass valve changes from the "filter sump" upward. By closing the bypass pipe and another bypass closing cover, the switching logic of the filter device can be easily changed, i.e., the bypass goes directly to the intake side. This change is possible among other things by using the novel, internally hollow bypass valve in a spool construction. Furthermore, with the filter device according to the invention without the filter element inserted no buildup of feed pressure is ensured to indicate a missing filter element. Due to the special trapezoidal shape of the cross channels, the novel bypass cap in a cross flow construction prevents the cross section of the filtered oil from being constricted so that energy losses are avoided in filter operation.

While one embodiment has been chosen to illustrate the invention, it will be understood by those skilled in the art that various changes and modifications can be made therein without departing from the scope of the invention as defined in the appended claims.

What is claimed is:

1. A reflux vacuum filter device, comprising:
   at least one filter housing having a head-side cover part with fluid guides, having at least one filter input for reflux fluid and having at least one filter output for cleaned fluid;
   at least one filter element extending in said filter housing along a longitudinal axis and having an upper region bordered by said fluid guides; and
   a bypass valve and a back pressure valve arranged in said filter housing concentrically to and along said longitudinal axis, said bypass valve being in a region of said cover part, in fluid communication with one of said fluid guides and located at said filter input.

2. A reflux vacuum filter device according to claim 1 wherein
   a replenishing valve is arranged in said filter housing concentrically to and along said longitudinal axis.

3. A reflux vacuum filter device according to claim 1 wherein
   said filter housing comprises a bottom side tank connection for discharging excess reflux amounts to a tank; and
   said back pressure valve is in a bottom region of said filter housing adjacent said tank connection for blocking and clearing a fluid connection and is located between said filter output and said tank connection.

4. A reflux vacuum filter device according to claim 3 wherein
   a replenishing valve is arranged in said filter housing concentrically to and along said longitudinal axis and is located underneath said back pressure valve nearest said tank connection in said bottom region of said filter housing.

5. A reflux vacuum filter device according to claim 2 wherein
   said filter element comprises a filter medium for fluid flow during filtration from an outside thereof to an inside thereof and a coaxial fluid-permeable support pipe surrounded by said filter medium; and
   a concentric interior pipe is located within and spaced at a distance from said support pipe, an exterior of said interior pipe receiving cleaned fluid that passed through said filter medium and being in fluid communication with said replenishing valve and said back pressure valve located in a bottom region of said filter housing on an end of said interior pipe.

6. A reflux vacuum filter sleeve according to claim 5 wherein
   a pipe body in said bottom region of said filter housing continues said interior pipe, said back pressure valve and said replenishing valve having valve bodies movably guided on said pipe body for opening and closing movements opposite one another.

7. A reflux vacuum filter according to claim 6 wherein
   closing springs of said back pressure valve and said replenishing valve surround said pipe body.

8. A reflux vacuum filter device according to claim 7 wherein
   said valve body of said back pressure valve comprises a hollow cylindrical extension extending along exteriors of said closing springs and guided on an inside of a cup-shaped spring housing with a cylindrical wall concentrically surrounding said pipe body and with a bottom penetrated by said pipe body, said pipe body having an end forming a tank connection.

9. A reflux vacuum filter device according to claim 8 wherein
   said bottom of said spring housing forms a valve seat for a ring plate forming said valve body of said replenishing valve and blocking and clearing replenishment openings in said bottom of said spring housing.

10. A reflux vacuum filter device according to claim 9 wherein
    said valve body of said back pressure valve comprises fluid passages connecting an interior of said spring housing to an exterior of said pipe body and said exterior of said interior pipe forming a clean side of said filter element.

11. A reflux vacuum filter device according to claim 1 wherein
    said bypass valve is integrated in a head-side end cap of said filter element, said end cap having at least bypass channel therein connecting with said filter element said filter input to an input side of said bypass valve, said filter input being in said cover part.

12. A reflux vacuum filter device according to claim 11 wherein
said bypass valve comprises a spring-loaded spool valve including a spool guided in a hollow-cylindrical housing oriented concentric to said longitudinal axis, dynamic pressure opening said bypass valve forming a fluid connection between a bypass channel of said bypass valve and an interior of said valve housing thereof.

13. A reflux vacuum filter device according to claim 12 wherein
said filter element comprises a filter medium for fluid flow during filtration from an outside thereof to and inside thereof and a coaxial fluid-permeable support pipe surrounded by said filter medium;
a concentric interior pipe is located within and spaced at a distance from said support pipe, an exterior of said interior pipe receiving cleaned fluid that passed through said filter medium and being in fluid communication with said replenishing valve and said back pressure valve located in a bottom region of said filter housing on an end of said interior pipe; and
said interior pipe forms a bypass pipe with an inside thereof providing a fluid connection on an interior of a valve housing of said bypass valve and a tank connection located in a bottom region of said filter housing.

14. A reflux vacuum filter device according to claim 13 wherein
said interior pipe is closed; and
said valve housing comprises an outflow region forming a fluid connection from said interior of valve housing of said bypass valve to said filter output when said bypass valve is open.

15. A reflux vacuum filter device according to claim 14 wherein
said outflow region comprises openings in a valve housing cover of said bypass valve, said valve housing cover being a head-side plug forming a support for a closing spring of said bypass valve.

16. A reflux vacuum filter device according to claim 15 wherein
said openings in said valve housing cover are arranged in a star pattern and have trapezoidal opening surfaces.

17. A reflux vacuum filter device according to claim 11 wherein
a bypass filter is located in said bypass channel and is integrated in the respective fluid guide in said cover part.

18. A reflux vacuum filter device according to claim 8 wherein
a carrier forms an enclosure on said bottom of said spring housing,
an extension said pipe body receives a replenishment filter inserted in a fluid path between replenishment openings of said replenishing valve to a tank connection.

19. A reflux filter device, comprising:
at least one filter housing;
at least one filter element extending in said filter housing along a longitudinal axis, said filter element including a filter medium for fluid flow during filtration from an outside thereof to an inside thereof and a coaxial fluid-permeable support pipe surround by said filter medium;
a bypass valve and a back pressure valve arranged in said filter housing concentrically to and along said longitudinal axis;
a replenishing valve arranged in said filter housing concentrically to and along said longitudinal axis;
a concentric interior pipe located within and spaced at a distance from said support pipe, an exterior of said interior pipe receiving cleaned fluid that passed through said filter medium and being in fluid communication with said replenishing valve and said back pressure valve located in a bottom region of said filter housing on an end of said interior pipe.

20. A reflux vacuum filter device according to claim 19 wherein
said filter housing comprises a bottom side tank connection for discharging excess reflux amounts to a tank; and
said back pressure valve is in a bottom region of said filter housing adjacent said tank connection for blocking and clearing a fluid connection and is located between said filter output and said tank connection.

21. A reflux vacuum filter device according to claim 20 wherein
said replenishing valve is located underneath said back pressure valve nearest said tank connection in said bottom region of said filter housing.

22. A reflux vacuum filter device according to claim 19 wherein
a pipe body in said bottom region of said filter housing continues said interior pipe, said back pressure valve and said replenishing valve having valve bodies movably guided on said pipe body for opening and closing movements opposite one another.

23. A reflux vacuum filter according to claim 22 wherein
closing springs of said back pressure valve and said replenishing valve surround said pipe body.

24. A reflux vacuum filter device according to claim 23 wherein
said valve body of said back pressure valve comprises a hollow cylindrical extension extending along exteriors of said closing springs and guided on an inside of a cup-shaped spring housing with a cylindrical wall concentrically surrounding said pipe body and with a bottom penetrated by said pipe body, said pipe body having an end forming a tank connection.

25. A reflux vacuum filter device according to claim 24 wherein
said bottom of said spring housing forms a valve seat for a ring plate forming said valve body of said replenishing valve and blocking and clearing replenishment openings in said bottom of said spring housing.

26. A reflux vacuum filter device according to claim 25 wherein
said valve body of said back pressure valve comprises fluid passages connecting an interior of said spring housing to an exterior of said pipe body and said exterior of said interior pipe forming a clean side of said filter element.

27. A reflux vacuum filter device according to claim 19 wherein
said bypass valve is integrated in a head-side end cap of said filter element, said end cap having at least bypass channel therein connecting with said filter element a filter input to an input side of said bypass valve, said filter input being in a cover part of said housing.

28. A reflux vacuum filter device according to claim 27 wherein
said bypass valve comprises a spring-loaded spool valve including a spool guided in a hollow-cylindrical housing oriented concentric to said longitudinal axis, dynamic pressure opening said bypass valve forming a fluid connection between a bypass channel of said bypass valve and an interior of said valve housing thereof.

29. A reflux vacuum filter device according to claim 28 wherein
said interior pipe forms a bypass pipe with an inside thereof providing a fluid connection on an interior of a valve housing of said bypass valve and a tank connection located in a bottom region of said filter housing.

30. A reflux vacuum filter device according to claim 29 wherein
said interior pipe is closed; and
said valve housing comprises an outflow region forming a fluid connection from said interior of valve housing of said bypass valve to said filter output when said bypass valve is open.

31. A reflux vacuum filter device according to claim 30 wherein
said outflow region comprises openings in a valve housing cover of said bypass valve, said valve housing cover being a head-side plug forming a support for a closing spring of said bypass valve.

32. A reflux vacuum filter device according to claim 31 wherein
said openings in said valve housing cover are arranged in a star pattern and have trapezoidal opening surfaces.

33. A reflux vacuum filter device according to claim 27 wherein
a bypass filter is located in said bypass channel and is integrated in the respective fluid guide in said cover part.

34. A reflux vacuum filter device according to claim 24 wherein
a carrier forms an enclosure on said bottom of said spring housing,
an extension said pipe body receives a replenishment filter inserted in a fluid path between replenishment openings of said replenishing valve to a tank connection.

\* \* \* \* \*